US012742220B2

(12) United States Patent
Lee et al.

(10) Patent No.: US 12,742,220 B2
(45) Date of Patent: Sep. 22, 2026

(54) WIRE ROD AND STEEL WIRE FOR HIGH STRENGTH SPRING, AND MANUFACTURING METHOD THEREFOR

(71) Applicant: POSCO, Pohang-si (KR)

(72) Inventors: Jun Mo Lee, Pohang-si (KR); Seok-Hwan Choi, Pohang-si (KR); Myung Soo Choi, Pohang-si (KR); Han Hwi Kim, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 783 days.

(21) Appl. No.: 17/626,010

(22) PCT Filed: Jun. 22, 2020

(86) PCT No.: PCT/KR2020/008088
§ 371 (c)(1),
(2) Date: Jan. 10, 2022

(87) PCT Pub. No.: WO2021/125470
PCT Pub. Date: Jun. 24, 2021

(65) Prior Publication Data

US 2022/0251675 A1 Aug. 11, 2022

(30) Foreign Application Priority Data

Dec. 20, 2019 (KR) ........................ 10-2019-0172263

(51) Int. Cl.

| | |
|---|---|
| ***C21D 9/02*** | (2006.01) |
| ***C21D 6/00*** | (2006.01) |
| ***C22C 38/00*** | (2006.01) |
| ***C22C 38/02*** | (2006.01) |
| ***C22C 38/04*** | (2006.01) |
| ***C22C 38/06*** | (2006.01) |
| ***C22C 38/18*** | (2006.01) |
| ***F16F 1/02*** | (2006.01) |

(52) U.S. Cl.
CPC ............... *C21D 9/02* (2013.01); *C21D 6/002* (2013.01); *C21D 6/005* (2013.01); *C21D 6/008* (2013.01); *C22C 38/001* (2013.01); *C22C 38/002* (2013.01); *C22C 38/02* (2013.01); *C22C 38/04* (2013.01); *C22C 38/06* (2013.01); *C22C 38/18* (2013.01); *F16F 1/02* (2013.01); *C21D 2211/005* (2013.01); *C21D 2211/009* (2013.01)

(58) Field of Classification Search
CPC .... C21D 9/02; C21D 6/005; C21D 2211/009; C22C 38/001; C22C 38/002; C22C 38/02; C22C 38/04; C22C 38/18
See application file for complete search history.

(56) References Cited

U.S. PATENT DOCUMENTS

| | | | | |
|---|---|---|---|---|
| 4,406,711 | A | 9/1983 | Nagumo et al. | |
| 5,183,634 | A | 2/1993 | Abe et al. | |
| 5,508,002 | A | 4/1996 | Kawaguchi et al. | |
| 6,264,759 | B1 | 7/2001 | Bae et al. | |
| 9,404,547 | B2 | 8/2016 | Okada et al. | |
| 10,041,160 | B2 | 8/2018 | Honjo et al. | |
| 10,174,399 | B2 * | 1/2019 | Okonogi | C22C 38/16 |
| 11,118,251 | B2 * | 9/2021 | Suzuki | C22C 38/42 |
| 2016/0237518 | A1 | 8/2016 | Mesplont | |
| 2020/0255921 | A1 | 8/2020 | Kim | |

FOREIGN PATENT DOCUMENTS

| | | | |
|---|---|---|---|
| CN | 102227512 | A | 10/2011 |
| CN | 105568163 | A | 5/2016 |
| CN | 107557663 | A | 1/2018 |
| CN | 108179355 | A | 6/2018 |
| CN | 108291287 | A | 7/2018 |
| CN | 108559910 | A | 9/2018 |
| CN | 114207168 | B | 8/2023 |
| JP | S48-313 | | 1/1973 |
| JP | H05-78785 | A | 3/1993 |
| JP | H06-158223 | A | 6/1994 |
| JP | H09-1436321 | A | 6/1997 |
| JP | 2002-097551 | A | 4/2002 |
| JP | 2006-183137 | A | 7/2006 |
| JP | 2012-102378 | A | 5/2012 |
| JP | 2019-178405 | A | 10/2019 |
| KR | 10-2002-0049924 | A | 6/2002 |
| KR | 10-2013-0035274 | A | 4/2013 |
| KR | 10-2014-0009881 | A | 1/2014 |
| KR | 10-2014-0084772 | A | 7/2014 |
| KR | 10-2015-0081366 | A | 7/2015 |
| KR | 10-2016-0047489 | A | 5/2016 |
| KR | 10-1767838 | B1 | 8/2017 |
| KR | 10-2018-0026014 | A | 3/2018 |

(Continued)

OTHER PUBLICATIONS

Indian Office Action dated Aug. 2, 2022 issued in Indian Patent Application No. 202217001367 (with English translation).

(Continued)

*Primary Examiner* — Sally A Merkling
*Assistant Examiner* — Nazmun Nahar Shams
(74) *Attorney, Agent, or Firm* — Morgan Lewis & Bockius LLP

(57) ABSTRACT

A wire rod and a steel wire for a high stress suspension spring for motorcycles, wherein decarbonization and low-temperature structure occurrence are easily suppressed when the wire rod and the steel wire are cooled down; and a manufacturing method therefor. A steel wire for a high strength spring includes, in percent by weight (wt %), 0.55 to 0.65% of carbon (C), 0.5 to 0.9% of silicon (Si), 0.3 to 0.8% of manganese (Mn), 0.3 to 0.6% of chromium (Cr), 0.015% or less of phosphorus (P), 0.01% or less of sulfur (S), 0.01% or less of aluminum (Al), 0.005% or less of nitrogen (N), and the remainder of iron (Fe) and inevitable impurities, satisfies Formula (1) below, and comprises 90% or more of a tempered martensite structure. In Formula (1), C, Mn, Cr, and Si denote contents (wt %) of the corresponding elements, respectively. (1) $0.77 \le C+(1/6)*Mn+(1/5)*Cr+(1/24)*Si \le 0.83$.

6 Claims, No Drawings

(56) References Cited

FOREIGN PATENT DOCUMENTS

| | | | |
|---|---|---|---|
| KR | 10-2018-0110002 | A | 10/2018 |
| KR | 10-2019-0037680 | A | 4/2019 |
| KR | 10-2019-0074430 | A | 6/2019 |
| WO | 2015/037246 | A1 | 3/2015 |
| WO | 2015/052035 | A1 | 4/2015 |

OTHER PUBLICATIONS

Office Action dated May 26, 2022 issued in Chinese Patent Application No. 202080053112.7 (with English translation).
Chinese Office Action dated Jan. 5, 2023 issued in Chinese Patent Application No. 202080053112.7 (with English translation).
Indonesian Office Action dated Jan. 13, 2023 issued in Indonesian Patent Application No. P00202200688.
Japanese Office Action dated Feb. 7, 2023 issued in Japanese Patent Application No. 2022-504013 (with English translation).
Extended European Search Report dated Feb. 23, 2023 issued in European Patent Application No. 20901227.7.
Office Action issued in corresponding Japanese Patent Application No. 2022-504013 dated Jan. 16, 2024, with English translation.
Chinese Notice of Allowance dated May 24, 2023 issued in Chinese Patent Application No. 202080053112.7 (with English translation).
Japanese Office Action dated Aug. 15, 2023 issued in Japanese Patent Application No. 2022-504013 (with English translation).
Office Action issued Mar. 29, 2024 for Vietnamese Patent Application No. 1-2022-00489 (See English Translation).
International Search Report dated Sep. 28, 2020 issued in International Patent Application No. PCT/KR2020/008088 (with English translation).
Korean Notice of Allowance dated Nov. 25, 2021 issued in Korean Patent Application No. 10-2019-0172263.
Korean Office Action dated Jun. 10, 2021 issued in Korean Patent Application No. 10-2019-0172263.
Indonesian Office Action dated Jul. 31, 2024 issued in Indonesian Patent Application No. P00202200688 (with English translation).
Malaysia Office Action dated Dec. 18, 2024 issued in Malaysia Patent Application No. PI2022000117.
Malaysian Office Action dated Jul. 8, 2025 issued in Malaysian Patent Application No. PI2022000117.

* cited by examiner

WIRE ROD AND STEEL WIRE FOR HIGH STRENGTH SPRING, AND MANUFACTURING METHOD THEREFOR

CROSS-REFERENCE OF RELATED APPLICATIONS

This application is the U.S. National Phase under 35 U.S.C. § 371 of International Patent Application No. PCT/KR2020/008088, filed on Jun. 22, 2020, which in turn claims the benefit of Korean Application No. 10-2019-0172263, filed on Dec. 20, 2019, the entire disclosures of which applications are incorporated by reference herein.

TECHNICAL FIELD

The present disclosure relates to a wire rod and a steel wire for a spring having an ultra-high strength of 1,800 MPa, and more particularly, to a wire rod and a steel wire for a high stress suspension spring for motorcycles, wherein decarbonization and low-temperature structure occurrence are easily suppressed when the wire rod and the steel wire are cooled down, and a manufacturing method therefor.

BACKGROUND ART

Similar to the market for automotive materials, development of lightweight materials or structural modification has been continuously conducted in the market for motorcycle materials and demands for steels used in high-strength springs have recently increased since dual-type suspensions used in conventional motorcycles have been replaced with mono-type suspensions.

Drawn wire rods, which have been conventionally used for springs of motorcycle suspensions, are not suitable for use in mono-type suspensions due to insufficient strength and fatigue resistance. Therefore, application of wire rods having a tempered martensite structure for automobiles has been considered. However, because quality standards for suspension springs of automobiles are stringent and also manufacturing the suspension springs is difficult and costly, it is difficult to apply the suspension springs for automobiles to motorcycles. Particularly, suspension springs for automobiles have a relatively greater diameter than those for motorcycles, so that it is difficult to control a low-temperature structure. Therefore, there is a need to develop high-strength suspension springs applicable to motorcycles.

DISCLOSURE

Technical Problem

The present disclosure provides a wire rod and a steel wire for a high-strength spring for motorcycles capable of easily suppressing decarbonization and low-temperature structure occurrence by lowering a carbon equivalent ($C_{eq}$), using minimum alloy elements, and optimizing heat treatment during manufacture of the steel wire, and a method of manufacturing the same.

Technical Solution

One aspect of the present disclosure provides a wire rod for a high-strength spring including, in percent by weight (wt %), 0.55 to 0.65% of carbon (C), 0.5 to 0.9% of silicon (Si), 0.3 to 0.8% of manganese (Mn), 0.3 to 0.6% of chromium (Cr), 0.015% or less of phosphorus (P), 0.01% or less of sulfur (S), 0.01% or less of aluminum (Al), 0.005% or less of nitrogen (N), and the remainder of iron (Fe) and inevitable impurities, and satisfying Formula (1) below.

$$0.77 \leq C + (1/6) * Mn + (1/5) * Cr + (1/24) * Si \leq 0.83 \quad (1)$$

In Formula 1, C, Mn, Cr, and Si denote contents (wt %) of the elements, respectively.

Also, according to an embodiment of the present disclosure, a thickness of a surface ferrite decarbonized layer may be 1 μm or less.

Also, according to an embodiment of the present disclosure, an area fraction of a low-temperature structure having a hardness of 430 Hv or more may be 5% or less in a cross-sectional area.

Also, according to an embodiment of the present disclosure, a tensile strength may be 1,200 MPa or less.

Another aspect of the present disclosure provides a steel wire for a high-strength spring including, in percent by weight (wt %), 0.55 to 0.65% of carbon (C), 0.5 to 0.9% of silicon (Si), 0.3 to 0.8% of manganese (Mn), 0.3 to 0.6% of chromium (Cr), 0.015% or less of phosphorus (P), 0.01% or less of sulfur (S), 0.01% or less of aluminum (Al), 0.005% or less of nitrogen (N), and the remainder of iron (Fe) and inevitable impurities, and satisfying Formula (1) below, wherein the steel wire includes 90% or more of a tempered martensite structure.

$$0.77 \leq C + (1/6) * Mn + (1/5) * Cr + (1/24) * Si \leq 0.83 \quad (1)$$

Also, according to an embodiment of the present disclosure, an average grain size of prior austenite may be 25 μm or less.

Also, according to an embodiment of the present disclosure, a tensile strength may be 1,700 MPa or more and a reduction in area (RA) may be 35% or more.

Another aspect of the present disclosure provides a method of manufacturing a steel wire for a high-strength spring including: preparing a steel wire having a diameter of 15 mm or less by drawing a wire rod including, in percent by weight (wt %), 0.55 to 0.65% of carbon (C), 0.5 to 0.9% of silicon (Si), 0.3 to 0.8% of manganese (Mn), 0.3 to 0.6% of chromium (Cr), 0.015% or less of phosphorus (P), 0.01% or less of sulfur (S), 0.01% or less of aluminum (Al), 0.005% or less of nitrogen (N), and the remainder of iron (Fe) and inevitable impurities, and satisfying Formula (1) below; heating the steel wire to a temperature range of 900 to 1,000° C. within 10 seconds and maintaining the temperature for 5 to 30 seconds; water-quenching the heated steel wire at a high pressure; tempering the water-quenched steel wire by heating the steel wire to a temperature range of 400 to 500° C. within 10 seconds and maintaining the temperature within 30 seconds; and water-quenching the tempered steel wire.

$$0.77 \leq C + (1/6) * Mn + (1/5) * Cr + (1/24) * Si \leq 0.83 \quad (1)$$

Also, according to an embodiment of the present disclosure, a microstructure of the wire rod may include 80% or more of pearlite and the remainder of ferrite.

Also, according to an embodiment of the present disclosure, a thickness of a ferrite decarbonized layer on the surface of the wire rod may be 1 μm or less.

Also, according to an embodiment of the present disclosure, the wire rod may include a low-temperature structure having a hardness of 430 Hv or more in an area fraction of 5% or less in a cross-sectional area.

Also, according to an embodiment of the present disclosure, the tempered, water-quenched steel wire may include 90% or more of a tempered martensite structure.

Also, according to an embodiment of the present disclosure, an average grain size of austenite of the heated steel wire may be 25 μm or less.

Advantageous Effects

According to the present disclosure, a low-temperature structure may be easily controlled by optimizing a carbon equivalent ($C_{eq}$) even in a low-cost composition including low contents of alloy elements while minimizing use of expensive alloy elements such as Mo and V and decarbonization may be minimized on the surface of the wire rod by lowering the Si content.

Also, a steel wire for springs having high strength and high ductility in which decarbonized and low-temperature structure occurrence are easily controlled may be provided by optimizing the alloy elements and optimizing heat treatment during the manufacture of the steel wire.

BEST MODE

A wire rod for a high-strength spring according to an embodiment of the present disclosure includes, in percent by weight (wt %), 0.55 to 0.65% of carbon (C), 0.5 to 0.9% of silicon (Si), 0.3 to 0.8% of manganese (Mn), 0.3 to 0.6% of chromium (Cr), 0.015% or less of phosphorus (P), 0.01% or less of sulfur (S), 0.01% or less of aluminum (Al), 0.005% or less of nitrogen (N), and the remainder of iron (Fe) and inevitable impurities, and satisfies Formula (1) below, wherein a microstructure includes 80% or more of pearlite and the remainder of ferrite.

$$0.77 \le C + (1/6) * Mn + (1/5) * Cr + (1/24) * Si \le 0.83 \quad (1)$$

In Formula (1), C, Mn, Cr, and Si denote contents (wt %) of the elements, respectively.

Modes of the Invention

Hereinafter, embodiments of the present disclosure will be described in detail with reference to the accompanying drawings. The following embodiments are provided to fully convey the spirit of the present disclosure to a person having ordinary skill in the art to which the present disclosure belongs. The present disclosure is not limited to the embodiments shown herein but may be embodied in other forms. In the drawings, parts unrelated to the descriptions are omitted for clear description of the disclosure and sizes of elements may be exaggerated for clarity.

Throughout the specification, the term "include" an element does not preclude other elements but may further include another element, unless otherwise stated.

As used herein, the singular forms are intended to include the plural forms as well, unless the context clearly indicates otherwise.

As used herein, the term "low-temperature structure" means bainite or martensite collectively referring to a hard form of steel crystalline structure formed by quenching steels which will be obvious to those skilled in the art.

Applying steel materials for automobiles having a tempered martensite structure to mono-type suspensions for motorcycles to obtain high strength has caused cost problems and problems in controlling low-temperature structure occurrence. Because oil quenching has been used in the past to obtain sufficient hardenability after heat treatment in a heat-treating furnace while a tempered martensite structure is formed, Mn and Cr should be included in more than a certain amount. However, with the development of induction heat treatment technology, sufficient cooling ability may be obtained by using water quenching. Also, since steel materials for springs of motorcycles have a relatively smaller diameter than that of those for automobiles, the possibility of using low $C_{eq}$ alloy components has increased. Therefore, a target strength may be obtained while reducing the contents of the alloy elements in comparison with steel materials for springs of automobiles.

In the case of low $C_{eq}$, prices of the materials may be stabilized to control decarbonization and low-temperature structure occurrence in small-diameter materials, and prices of products may be lowered by reducing the alloy elements.

A wire rod and a steel wire for a high-strength spring according to the present disclosure includes, in percent by weight (wt %), 0.55 to 0.65% of carbon (C), 0.5 to 0.9% of silicon (Si), 0.3 to 0.8% of manganese (Mn), 0.3 to 0.6% of chromium (Cr), 0.015% or less of phosphorus (P), 0.01% or less of sulfur (S), 0.01% or less of aluminum (Al), 0.005% or less of nitrogen (N), and the remainder of iron (Fe) and inevitable impurities, and satisfies Formula (1) below.

Hereinafter, reasons for numerical limitations on the contents of alloy elements in the embodiment of the present disclosure will be described. Hereinafter, the unit is wt % unless otherwise stated.

The content of C is from 0.55 to 0.65%.

C is an element added to obtain strength of products. When the C content is less than 0.55%, a carbon equivalent ($C_{eq}$) cannot be obtained so that a martensite structure is not completely formed during cooling making it difficult to obtain strength. Even when the martensite structure is formed, it may be difficult to obtain a target strength. When the C content exceeds 0.65%, impact resistance may deteriorate and cracks may occur during water quenching, and thus the C content is limited.

The content of Si is from 0.5 to 0.9%.

Si is used for deoxidization of steels and is also effective for enhancing strength via solid solution strengthening. However, an excess of Si may cause decarbonization on the surface and it is difficult to process materials. Therefore, the Si content is controlled in the range of 0.5 to 0.9% in accordance with the target strength and the degree of processing materials.

The content of Mn is from 0.3 to 0.8%.

Mn is a hardenability-enhancing element as one of the essential elements for forming a high-strength tempered martensite structure. However, as the Mn content increases in a steel having a tempered martensite structure, toughness decreases, and therefore the Mn content is controlled in the range of 0.3 to 0.8%.

The content of Cr is from 0.3 to 0.6%.

Cr is effective for enhancing hardenability together with Mn and enhances corrosion resistance of a steel. Thus, the Cr content may be adjusted to a certain level. However, because Cr is a relatively expensive element compared to Si and Mn and increases the carbon equivalent ($C_{eq}$), the Cr content is controlled in the range of 0.3 to 0.6%.

The content of P is 0.015% or less.

Because P is an element segregated in grain boundaries to deteriorate toughness and deteriorate hydrogen delayed fracture resistance, it is desirable to remove P from steel materials as mulch as possible. Therefore, an upper limit thereof is set to 0.015%.

The content of S is 0.01% or less.

Like P, S is segregated in grain boundaries to deteriorate toughness and forms MnS to deteriorate hydrogen delayed fracture resistance. Therefore, the S content is adjusted to 0.01% or less.

The content of Al is 0.01% or less.

Al, as the most powerful deoxidizing element, may increase purity by removing oxygen from a steel. However, since A1203 inclusions may be formed by Al, and an excess of Al may deteriorate fatigue resistance. Therefore, the Al content is adjusted to 0.01% or less.

The content of N is 0.005% or less.

N binds to an impurity, Al, or V to form coarse AlN or VN precipitates that are not melted during heat treatment. Therefore, the N content should be controlled to be 0.005% or less.

The remaining component of the above-described composition is iron (Fe) and the composition includes impurities inevitably incorporated. In the present disclosure, addition of other alloy elements in addition to the above-described alloy components is not excluded.

In the present disclosure, the contents of C, Si, Mn, and Cr in the alloy composition need to satisfy Formula (1) below not only to apply a high cooling rate to prevent surface decarbonization during cooling the wire rod but also to suppress occurrence of a low-temperature structure such as martensite or bainite.

$$0.77 \leq C + (1/6)*Mn + (1/5)*Cr + (1/24)*Si \leq 0.83 \quad (1)$$

When a value of Formula (1) is less than 0.77, it may be difficult to obtain a sufficient amount of the martensite structure or a sufficient strength of the martensite structure at a high cooling rate. On the contrary, when the value of Formula (1) exceeds 0.83, a low-temperature structure is formed, so that drawability deteriorates and additional heat treatment is required, making it difficult to obtain a sufficient surface hardness.

When the low Si content within the range of 0.5 to 0.9% is maintained and the contents of C, Si, Mn, and Cr are controlled to satisfy Formula (1), surface decarbonization may be suppressed during cooling in the manufacturing process, so that a thickness of a ferrite decarbonized layer on the surface may be controlled to be 1 μm or less, and a low-temperature structure having a hardness of 430 Hv or more may not be formed in a cross-sectional area. In the present disclosure, the cross-sectional area denotes a cross-sectional area perpendicular to a lengthwise direction.

The wire rod for a high-strength spring according to the present disclosure may be manufactured by a common process for manufacturing wire rods for springs. For example, the wire rod may be manufactured by heating billets having the above-described alloy composition and satisfying Formula (1), and hot-rolling, coiling, and cooling the resultant.

The prepared wire rod has a microstructure including 80% or more of pearlite and the remainder of ferrite, and a thickness of a surface ferrite decarbonized layer may be 1 μm or less. In addition, a tensile strength of the wire rod may be 1,200 MPa or less.

Hereinafter, a method of manufacturing a steel wire for a spring using the above-described high-strength wire rod will be described.

The method of manufacturing a steel wire for a high-strength spring according to an embodiment of the present disclosure includes: preparing a steel wire having a diameter of 15 mm by drawing a wire rod including, in percent by weight (wt %), 0.55 to 0.65% of carbon (C), 0.5 to 0.9% of silicon (Si), 0.3 to 0.8% of manganese (Mn), 0.3 to 0.6% of chromium (Cr), 0.015% or less of phosphorus (P), 0.01% or less of sulfur (S), 0.01% or less of aluminum (Al), 0.005% or less of nitrogen (N), and the remainder of iron (Fe) and inevitable impurities, and satisfying Formula (1); heating the steel wire to a temperature range of 900 to 1,000° C. within 10 seconds and maintaining the temperature for 5 to 30 seconds; water-quenching the heated steel wire at a high pressure; tempering the water-quenched steel wire by heating the steel wire to a temperature range of 400 to 500° C. within 10 seconds and maintaining the temperature within 30 seconds; and water-quenching the tempered steel wire.

A conventional method of manufacturing a steel wire for a spring includes preparing a steel wire by drawing a wire rod and thermomechanically treating the steel wire. The thermomechanical treatment includes heating the steel wire, followed by austenizing, water-quenching, and tempering the resultant.

The steel wire for a high-strength spring according to the present disclosure is manufactured by drawing the wire rod satisfying the above-described alloy composition and Formula (1) to a wire diameter of 15 mm or less that is used in suspension springs for motorcycles.

Then, for quenching and tempering (QT) heat treatment, the drawn steel wire is heated to the temperature range of 900 to 1,000° C. within 10 seconds and maintained for 5 to 30 seconds for austenitization. When the heating time to a target temperature exceeds 10 seconds in the austenitization, grains grow making it difficult to obtain desired physical properties. In addition, when the maintaining time is less than 5 seconds, the pearlite structure may not be transformed into austenite, and when the maintaining time exceeds 30 seconds, coarse grains may be formed. Therefore, the maintaining time may be controlled in the range of 5 to 30 seconds.

The austenized steel wire is water-quenched at a high pressure enough to remove a boiling film. When oil-quenching is performed instead of water-quenching, a desired strength cannot be obtained due to a low carbon equivalent ($C_{eq}$). In addition, unless the high-water pressure enough to remove the boiling film is used during water-quenching, the probability of occurrence of quenching cracks increases, and thus cooling should be performed by spraying water from all directions at a pressure as high as possible during quenching.

The water-quenched steel wire is tempered by heating to the temperature range of 400 to 500° C. within 10 seconds and maintaining the temperature within 30 seconds. When the tempering temperature is below 400° C., toughness cannot be obtained so that processibility deteriorates and the risk of product breakage increases, and when the tempering temperature exceeds 500° C., strength may deteriorate. Therefore, the tempering temperature is controlled in the above-described range. In addition, when the heating to the target temperature is not performed within 10 seconds during tempering, coarse carbides are formed, thereby deteriorating toughness. Thus, the heating should be performed within 10 seconds.

Then, the tempered steel wire is water-quenched to room temperature.

The steel wire for springs manufactured under the manufacturing conditions according to the present disclosure includes 90% or more of a tempered martensite structure after heat treatment. In addition, because an average grain size of prior austenite is 25 μm or less and a tensile strength is 1,700 MPa or more, the steel wire may have high strength required for suspension springs for motorcycles. In addition, a high reduction in area (RA) of 35% or more may be obtained thereby having high ductility.

Hereinafter, the present disclosure will be described in more detail with reference to the following examples.

EXAMPLES

Steel materials including alloy compositions shown in Table 1 were prepared by ingot casting, homogenized by heat treatment at 1,200° C., hot-rolled to a final thickness of 14 mm while lowering the temperature from 980° C. to 820° C., and cooled at a rate of 2.5° C./s. Table 2 shows measurement results of a low-temperature structure area fraction on a cross-sectional area, hardness, tensile strength, and thickness of decarbonized layer of each of the wire rods prepared according to the above-described manufacturing process. In Table 2, the low-temperature structure area fraction (%) means an area fraction of a low-temperature structure on the cross-sectional area of the wire rod.

TABLE 1

| | Alloy element (wt %) | | | | | | | |
|---|---|---|---|---|---|---|---|---|
| | C | Si | Mn | Cr | P | S | Al | N |
| Comparative Example 1 | 0.6 | 1.5 | 0.6 | 0.4 | 0.011 | 0.004 | <0.003 | <0.005 |
| Comparative Example 2 | 0.45 | 0.8 | 0.8 | 0.6 | 0.01 | 0.005 | <0.003 | <0.005 |
| Comparative Example 3 | 0.6 | 0.5 | 1.0 | 0.0 | 0.01 | 0.004 | <0.003 | <0.005 |
| Example 1 | 0.6 | 0.8 | 0.6 | 0.4 | 0.009 | 0.005 | <0.003 | <0.005 |
| Example 2 | 0.6 | 0.6 | 0.3 | 0.6 | 0.011 | 0.005 | <0.003 | <0.005 |

TABLE 2

| | Formula (1) | Low-temperature structure area fraction (%) | Hardness of wire rod (Hv) | Tensile strength of wire rod (MPa) | Thickness of ferrite decarbonized layer (μm) | Thickness of total decarbonized layer (μm) |
|---|---|---|---|---|---|---|
| Comparative Example 1 | 0.803 | 0 | 318 | 1,030 | 22 | 60.2 |
| Comparative Example 2 | 0.737 | 0 | 235 | 762 | — | 22.8 |
| Comparative Example 3 | 0.788 | 0 | 266 | 881 | — | 38.1 |
| Example 1 | 0.813 | 0 | 291 | 950 | — | 34.5 |
| Example 2 | 0.795 | 0 | 288 | 930 | — | 22.4 |

The wire rods of Comparative Examples 1 to 3 and Examples 1 and 2 were drawn to steel wires having a diameter of 12 mm and heat-treated under the conditions shown in Table 3 below. High-pressure water-quenching was performed after austenitization and general water-quenching was performed after tempering.

TABLE 3

| | Formula (1) | Austenizing temperature (° C.) | Tempering temperature (° C.) | Average hardness (Hv) | RA (%) | Tensile strength (MPa) |
|---|---|---|---|---|---|---|
| Comparative Example 1 | 0.803 | 950 | 430 | 573 | 48 | 1,920 |
| Comparative Example 2 | 0.737 | 950 | 430 | 498 | 43 | 1,670 |
| Comparative Example 3 | 0.771 | 950 | 430 | 502 | 34 | 1,690 |
| Example 1 | 0.813 | 950 | 430 | 550 | 42 | 1,820 |
| Example 2 | 0.795 | 950 | 430 | 540 | 48 | 1,790 |

Referring to Tables 1 to 3, it was confirmed that a strength 1,700 MPa or more was obtained and a low-temperature structure was not formed during cooling in Examples 1 and 2 satisfying the alloy composition Formula (1) and manufacturing conditions of the present disclosure.

On the contrary, a ferrite decarbonized layer was formed during cooling because the Si content is excessive in Comparative Example 1. In Comparative Example 2, a target strength of 1,700 MPa or more could not be obtained because the value of Formula (1) was less than 0.77. In Comparative Example 3, a target strength of 1,700 MPa or more could not be obtained because the Cr content is out of the range defined by the present disclosure although the value of Formula (1) was more than 0.77 and less than 0.83, and the reduction in area (RA) was less than 35%.

While the present disclosure has been particularly described with reference to exemplary embodiments, it should be understood by those of skilled in the art that various changes in form and details may be made without departing from the spirit and scope of the present disclosure.

INDUSTRIAL APPLICABILITY

The wire rod for a high-strength spring according to the present disclosure may be applied to suspension springs for automobiles, motorcycles, and various transportation vehicles or as springs used in various industrial fields.

The invention claimed is:

1. A wire rod for a spring including, in percent by weight (wt %), 0.55 to 0.65% of carbon (C), 0.5 to 0.8% of silicon (Si), 0.3 to 0.8% of manganese (Mn), 0.4 to 0.6% of chromium (Cr), 0.015% or less of phosphorus (P), 0.01% or less of sulfur (S), 0.01% or less of aluminum (Al), 0.005% or less of nitrogen (N), and the remainder of iron (Fe) and inevitable impurities, and satisfying Formula (1) below, wherein a microstructure comprises 80% or more of pearlite and the remainder of ferrite and a thickness of a surface ferrite decarbonized layer is 1 μm or less, and wherein an area fraction of bainite or martensite structure is 5% or less in a cross-sectional area:

$$0.77 \leq C + (1/6) * Mn + (1/5) * Cr + (1/24) * Si \leq 0.83 \quad (1)$$

wherein C, Mn, Cr, and Si denote contents wt % of the elements, respectively.

2. The wire rod of claim 1, wherein a tensile strength is 1,200 MPa or less.

3. A method of manufacturing a steel wire for a high-strength spring, the method comprising:

preparing a steel wire having a diameter of 15 mm or less by drawing a wire rod of claim 1;

heating the steel wire to a temperature range of 900 to 1,000° C. within 10 seconds and maintaining the temperature for 5 to 30 seconds;

water-quenching the heated steel wire at a high pressure;

tempering the water-quenched steel wire by heating the steel wire to a temperature range of 400 to 500° C. within 10 seconds and maintaining the temperature within 30 seconds; and water-quenching the tempered steel wire.

4. The method of claim 3, wherein a microstructure of the wire rod comprises 80% or more of pearlite and the remainder of ferrite.

5. The method of claim 3, wherein a thickness of a ferrite decarbonized layer on the surface of the wire rod is 1 μm or less.

6. The method of claim 3, wherein the wire rod comprises a low-temperature structure having a hardness of 430 Hv or more in an area fraction of 5% or less in a cross-sectional area.

* * * * *